US012598139B2

(12) United States Patent
Rong

(10) Patent No.: US 12,598,139 B2
(45) Date of Patent: Apr. 7, 2026

(54) PACKET FORWARDING METHOD AND DEVICE, AND COMPUTER READABLE STORAGE MEDIUM

(71) Applicant: SANECHIPS TECHNOLOGY CO., LTD., Shenzhen (CN)

(72) Inventor: Lifeng Rong, Shenzhen (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 560 days.

(21) Appl. No.: 18/020,672

(22) PCT Filed: Aug. 17, 2021

(86) PCT No.: PCT/CN2021/112987
§ 371 (c)(1),
(2) Date: Aug. 7, 2023

(87) PCT Pub. No.: WO2022/037571
PCT Pub. Date: Feb. 24, 2022

(65) Prior Publication Data
US 2024/0056393 A1     Feb. 15, 2024

(30) Foreign Application Priority Data

Aug. 21, 2020    (CN) .......................... 202010851097.2

(51) Int. Cl.
*H04L 45/745*     (2022.01)
*H04L 45/645*     (2022.01)

(52) U.S. Cl.
CPC .......... *H04L 45/745* (2013.01); *H04L 45/645* (2022.05)

(58) Field of Classification Search
CPC .... H04L 45/306; H04L 45/645; H04L 45/745
See application file for complete search history.

(56) References Cited

U.S. PATENT DOCUMENTS

| 2020/0336425 A1* | 10/2020 | Galles | ................... | H04L 49/109 |
| 2021/0103536 A1* | 4/2021 | Galles | ................. | G06F 9/30038 |
| 2021/0216305 A1* | 7/2021 | Rathore | .................... | G06F 8/65 |

* cited by examiner

*Primary Examiner* — Donald L Mills
(74) *Attorney, Agent, or Firm* — Li & Cai Intellectual Property (USA) Office

(57) ABSTRACT

The present application relates to the field of communication technology, and discloses a packet forwarding method and device, and a computer readable storage medium. The packet forwarding method includes: determining a forwarding type of a packet, and acquiring configuration information corresponding to the forwarding type, the configuration information including a comparison type and an offset address of at least one set of comparators; configuring the at least one set of comparators according to the comparison type; acquiring a comparison data source of the at least one set of comparators according to the offset address; and determining a forwarding rule of the packet according to the comparison type of the at least one set of comparators as configured and the comparison data source of the at least one set of comparators as configured.

17 Claims, 3 Drawing Sheets

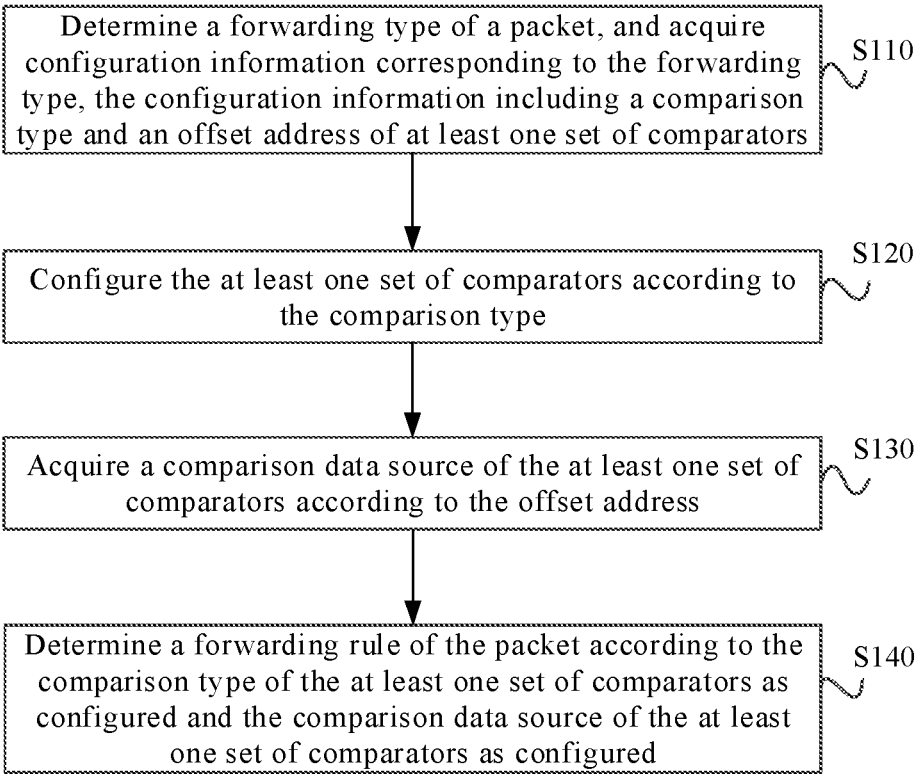

Determine a forwarding type of a packet, and acquire configuration information corresponding to the forwarding type, the configuration information including a comparison type and an offset address of at least one set of comparators  ~S110

Configure the at least one set of comparators according to the comparison type  ~S120

Acquire a comparison data source of the at least one set of comparators according to the offset address  ~S130

Determine a forwarding rule of the packet according to the comparison type of the at least one set of comparators as configured and the comparison data source of the at least one set of comparators as configured  ~S140

Fig. 1

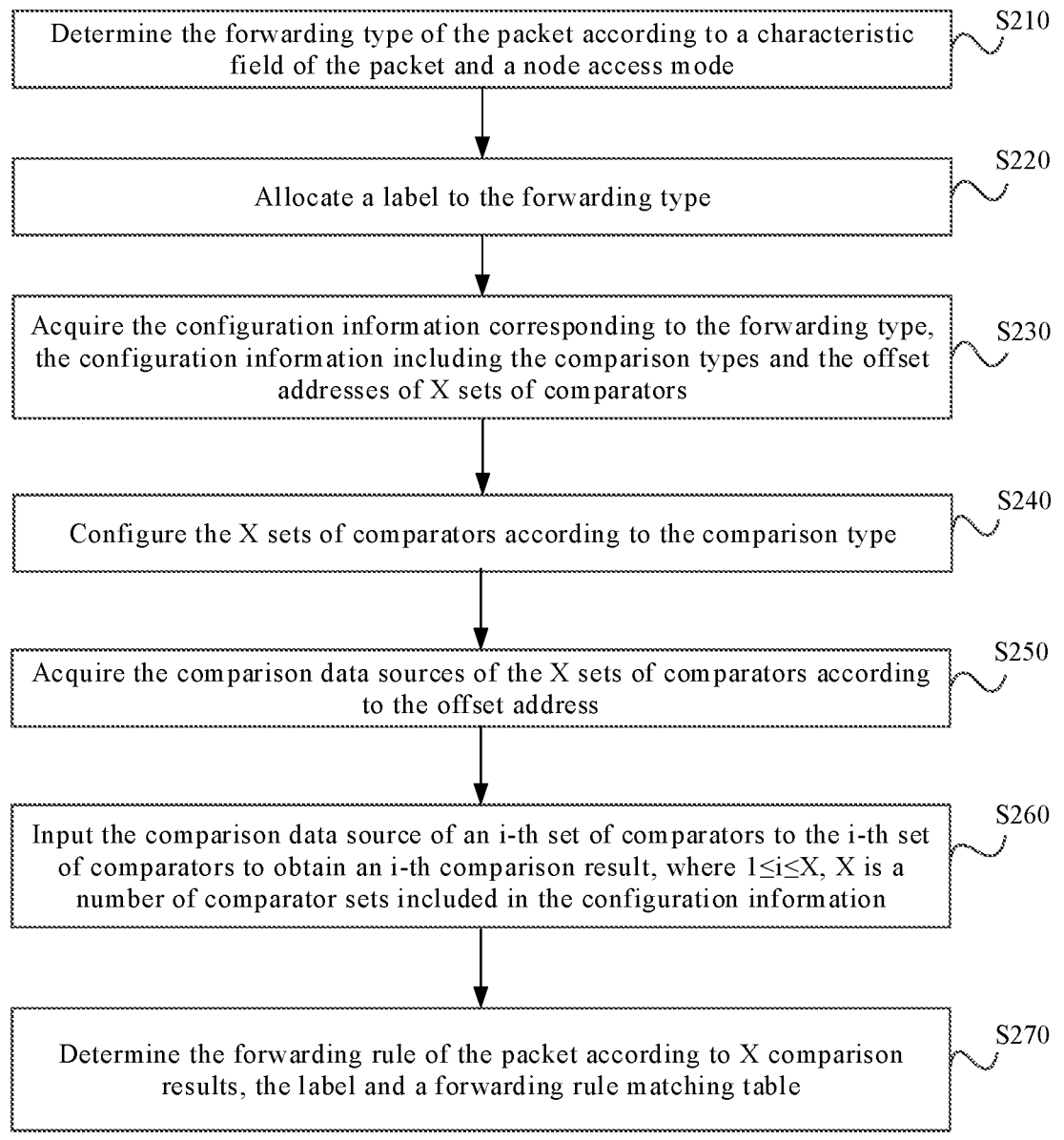

Determine the forwarding type of the packet according to a characteristic field of the packet and a node access mode          S210

Allocate a label to the forwarding type          S220

Acquire the configuration information corresponding to the forwarding type, the configuration information including the comparison types and the offset addresses of X sets of comparators          S230

Configure the X sets of comparators according to the comparison type          S240

Acquire the comparison data sources of the X sets of comparators according to the offset address          S250

Input the comparison data source of an i-th set of comparators to the i-th set of comparators to obtain an i-th comparison result, where $1 \leq i \leq X$, X is a number of comparator sets included in the configuration information          S260

Determine the forwarding rule of the packet according to X comparison results, the label and a forwarding rule matching table          S270

Fig. 2

PACKET FORWARDING METHOD AND DEVICE, AND COMPUTER READABLE STORAGE MEDIUM

The present application claims the priority of Chinese Patent Application No. 202010851097.2 filed with the China Patent Office on Aug. 21, 2020, the contents of which are incorporated herein in their entirety by reference.

TECHNICAL FIELD

The present application relates to the field of communication technology.

BACKGROUND

A programmable forwarding chip (also known as a programmable switching chip) is a programmable chip built into a network switch and hardware device, which enables data to be sent and received in a communication network. The programmable forwarding chip implemented by using the OpenFlow serial flow table is composed of multiple programmable Packet Process Cell (PPC).

SUMMARY

An embodiment of the present application provides a packet forwarding method including: determining a forwarding type of a packet, and acquiring configuration information corresponding to the forwarding type, the configuration information including a comparison type and an offset address of at least one set of comparators; configuring the at least one set of comparators according to the comparison type; acquiring a comparison data source of the at least one set of comparators according to the offset address; and determining a forwarding rule of the packet according to the comparison type of the at least one set of comparators as configured and the comparison data source of the at least one set of comparators as configured.

An embodiment of the present application provides a packet forwarding device including: a type determination module, a comparator configuration module, a data acquisition module and a rule matching module; the type determination module is configured to determine a forwarding type of a packet; the comparator configuration module is configured to acquire configuration information corresponding to the forwarding type, the configuration information including a comparison type and an offset address of at least one set of comparators, and to configure the at least one set of comparators according to the comparison type; the data acquisition module is configured to acquire a comparison data source of the at least one set of comparators according to the offset address; and the rule configuration module is configured to determine a forwarding rule of the packet according to the comparison type of the at least one set of comparators as configured and the comparison data source of the at least one set of comparators as configured.

An embodiment of the present application provides a packet forwarding device including a processor which is configured to, when executing a computer program, implements the packet forwarding method provided by an embodiment of the present application.

An embodiment of the present application provides a computer readable storage medium storing thereon a computer program which, when executed by a processor, implements the packet forwarding method provided by an embodiment of the present application.

BRIEF DESCRIPTION OF DRAWINGS

FIG. 1 is a schematic flowchart of a packet forwarding method.

FIG. 2 is another schematic flowchart of a packet forwarding method.

DETAIL DESCRIPTION OF EMBODIMENTS

Figure 3:
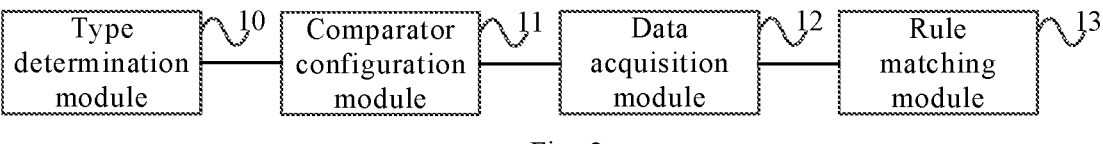
FIG. 3 is a schematic structural diagram of a packet forwarding device.

It should be understood that the specific embodiments described herein are only used to explain the present application, but not to limit the present application.

In the following description, words such as "module", "component" or "unit" for representing elements are used only to facilitate the description of the present application, and have no specific meaning per se. Thus, "module", "component" or "unit" may be used interchangeably.

In wired communication networks (such as transmission networks, bearer networks, and switching networks), packet forwarding behavior is usually determined by the characteristic fields of the packet and the layout of the switching network. The characteristic fields of the packet may include, but are not limited to, a Layer 2 Media Access Control (MAC) address, a Virtual Local Area Network (VLAN), a Layer 3 Internet Protocol (IP) address, Multiple Protocol Label Switching (MPLS) labels and other characteristic attributes that may determine packet forwarding behavior. The switching network may use Layer 3 IP routing, Layer 2 MAC address switching, or Layer 2/3 Virtual Private Network (VPN).

The traditional forwarding method is fixed logical forwarding using fixed conditions and fixed characteristic fields, which has a great advantage in the number of logical units used. However, with the continuous expansion of services, the traditional forwarding method is gradually marginalized due to insufficient flexibility. Currently, the mainstream forwarding method is implemented by using the RTC serial instructions of a network processor, and has forwarding characteristics that may be customized by users and flexible forwarding actions. However, the delay of this forwarding method is uncertain.

To this end, a new forwarding method emerges: forwarding is implemented by using the OpenFlow serial flow table. OpenFlow is a network communication protocol that belongs to the data link layer and may control the forwarding plane of switches or routers on the network, thereby changing the network path taken by network data packets. The programmable forwarding chip implemented by the OpenFlow serial flow table is composed of multiple programmable PPCs. Combined with the prefix search request, the Software Defined Network (SDN) controller issues the microcode very long instruction set to decide the forwarding purpose.

The programmable conditional comparator (hereinafter referred to as the comparator), together with its judgment logic, is an important component in the serial PPC forwarding structure. It does not depend on a specific forwarding service model, and has the characteristics of service independence and packet independence. The traditional implementation of the component is to use multiple static conditional comparators, and use the true and false attributes of the comparison results to query the truth table of Ternary Content Addressable Memory (TCAM) to complete the condition judgment. During implementation, due to the limitation of logical resources, the number of comparators contained in a single PPC is limited (usually the upper limit is 64). As the types of forwarding services increase, the comparison conditions become more and more complex, and the number of static conditional comparators also increases accordingly.

In order to solve the above problem, the embodiments of the present application provide a packet forwarding method and device, and a computer readable storage medium, which can dynamically edit the comparators and realize the reuse of the comparators, thereby realizing flexible handling of various forwarding services without increasing the number of comparators.

The terms "system" and "network" herein may often be used interchangeably in the present application. The following embodiments of the present application may be implemented independently, or may be implemented in combination with each other, which are not specifically limited in the embodiments of the present application.

In the following, the packet forwarding method and device and the technical effects thereof will be described.

A programmable forwarding chip includes multiple PPCs which are connected in series. According to the connection sequence, the multiple PPCs included in a programmable forwarding chip may be recorded as $PPC_1$, $PPC_2$, . . . , $PPC_N$ ($N \geq 2$), respectively, where $PPC_1$ is the uppermost first PPC, $PPC_1$ is the previous PPC of $PPC_2$, $PPC_2$ is the previous PPC of $PPC_3$, . . . , $PPC_n$ is the previous PPC of $PPC_{n-1}$. The method provided in the embodiment of the present application may be executed by a certain PPC in the programmable forwarding chip. FIG. 1 shows a schematic flowchart of a packet forwarding method, and the method includes the following operations S110 to S140.

In operation S110, a forwarding type of a packet is determined, and configuration information corresponding to the forwarding type is acquired, the configuration information including a comparison type and an offset address of at least one set of comparators.

When the programmable forwarding chip receives a packet, the packet may be processed by $PPC_1$, $PPC_2$, . . . , $PPC_N$ sequentially. When a PPC of a certain stage is processing, the forwarding type of the packet may be identified. This stage of PPC sets a label for the packet and sends the packet to the PPC of next stage for processing. Determining the forwarding type of the packet described in operation S110 may refer to the operation of directly reading the label, or may refer to the operation of setting the label. When it is the case of directly reading the label, the packet obtained by the $PPC_1$ does not include the label since the $PPC_1$ does not have a previous-stage PPC, that is, the $PPC_1$ cannot perform the operation of directly reading the label.

In an optional implementation, the operation of determining the forwarding type of the packet may include: determining the forwarding type of the packet according to a characteristic field of the packet and a node access mode, and allocating a label to the forwarding type.

The forwarding types of the packet are used for distinguishing different forwarding services (including but not limited to Layer 2 MAC address forwarding service, Layer 3 IP routing address forwarding service, MPLS label forwarding service, and other forwarding services). Different forwarding services have different forwarding process.

In an optional implementation, one label corresponds to one type of configuration information; or, at least two labels correspond to one type of configuration information.

For the case that one label corresponds to one type of configuration information, the label corresponds to the configuration information one-to-one. Assuming that there are P types of forwarding services (P is usually between 8 and 32), the number of labels is also P, there are also P forwarding types, and there are also P types of configuration information corresponding to labels.

For the case that at least two labels correspond to one type of configuration information, one type of configuration information corresponds to one forwarding template, and one forwarding template may correspond to multiple labels (for example, the Layer 2 MAC address forwarding service and the Layer 3 MAC address forwarding service both belong to the MAC address forwarding template). Assuming that there are P types of forwarding services (P is usually between 8 and 32), the number of labels is also P, and there are also P forwarding types. There are Q types of configuration information corresponding to the labels, where Q<P (Q is usually an integer less than or equal to 8). Compared with the solution in which one label corresponds to one type of configuration information, at least two labels corresponding to one type of configuration information can realize the compression of the configuration information, saving user configuration and resources.

In an optional implementation, the comparison type includes at least one of greater than, less than, equal to, not equal to, greater than or equal to (i.e., not less than), or less than or equal to (i.e., not greater than).

In operation S120, the at least one set of comparators is configured according to the comparison type.

In operation S130, a comparison data source of the at least one set of comparators is acquired according to the offset address.

Exemplarily, according to the offset address, the methods for acquiring the comparison data source of the at least one set of comparators may include at least one of the following method 1 or method 2.

In method 1, the comparison data source of the at least one set of comparators is acquired from the packet according to the offset address.

In method 2, the comparison data source of the at least one set of comparators is acquired from meta-frame information according to the offset address.

In operation S140, a forwarding rule of the packet is determined according to the comparison type of the at least one set of comparators as configured and the comparison data source of the at least one set of comparators as configured.

In this way, the comparators can be dynamically edited according to the forwarding types of different forwarding services, the traditional static conditional comparators can be converted into dynamic conditional comparators, and the reuse of the comparators under various service types can be realized, so that flexible handling of multiple types of forwarding services is realized without increasing the number of comparators, which ensures that the forwarding condition judgment of multiple service types by PPC of each stage is not only service-independent, but also applicable to multiple services and new service types.

On the basis of FIG. 1, FIG. 2 shows another schematic flowchart of the packet forwarding method, and the method may include the following operations S210-S270.

In operation S210, the forwarding type of the packet is determined according to a characteristic field of the packet and a node access mode.

In operation S220, a label is allocated to the forwarding type.

When the programmable forwarding chip receives a packet, the packet can be processed by $PPC_1$, $PPC_2$, . . . , $PPC_N$ sequentially. When a PPC of a certain stage is processing, the forwarding type of the packet may be identified. This stage of PPC sets a label for the packet and sends the packet to the PPC of next stage for processing.

The forwarding types of the packet are used for distinguishing different forwarding services (including but not limited to Layer 2 MAC address forwarding service, Layer 3 IP routing address forwarding service, MPLS label forwarding service, and other forwarding services). Different forwarding services have different forwarding process.

In operation S230, the configuration information corresponding to the forwarding type is acquired, the configuration information including the comparison types and the offset addresses of X sets of comparators.

In an optional implementation, the configuration information may further include a multi-bit fixed value for comparison and its mask.

In an optional implementation, one label corresponds to one type of configuration information; or, at least two labels correspond to one type of configuration information.

For the case that one label corresponds to one type of configuration information, the label corresponds to the configuration information one-to-one. Assuming that there are P types of forwarding services (P is usually between 8 and 32), the number of labels is also P, there are also P forwarding types, and there are also P types of configuration information corresponding to labels.

For the case that at least two labels correspond to one type of configuration information, one type of configuration information corresponds to one forwarding template, and one forwarding template may correspond to multiple labels (for example, the Layer 2 MAC address forwarding service and the Layer 3 MAC address forwarding service both belong to the MAC address forwarding template). Assuming that there are P types of forwarding services (P is usually between 8 and 32), the number of labels is also P, and there are also P forwarding types. There are Q types of configuration information corresponding to the labels, where Q<P (Q is usually an integer less than or equal to 8). Compared with the solution in which one label corresponds to one type of configuration information, at least two labels corresponding to one type of configuration information can realize the compression of the configuration information, saving user configuration and resources.

In an optional implementation, the comparison type includes at least one of greater than, less than, equal to, not equal to, greater than or equal to, or less than or equal to.

In operation S240, the X sets of comparators is configured according to the comparison type.

Assuming that a PPC is configured with Y sets of comparators, then the number X of comparator sets included in the configuration information is less than or equal to Y.

Each set of comparators supports 2 comparison logics or 3 comparison logics (that is, each set of comparators includes 2 comparators or 3 comparators). Assuming that each set of comparators in the X sets of comparators supports 2 comparison logics, then the configuration information corresponding to the forwarding type includes a total of 2X comparators, and the 2X comparators are configured according to respective comparison types of the comparators; assuming that each set of comparators in the X sets of comparators supports 3 comparison logics, then the configuration information corresponding to the forwarding type includes a total of 3X comparators, and the 3X comparators are configured according to respective comparison types of the comparator.

Of course, in the X sets of comparators, some sets of comparators may support two comparison logics, and the other sets of comparators may support three comparison logics, which are not specifically limited in the embodiment of the present application.

In operation S250, the comparison data sources of the X sets of comparators are acquired according to the offset address.

Exemplarily, according to the offset address, the methods for acquiring the comparison data source of X sets of comparators may include at least one of the following method 1 or method 2.

In method 1, the comparison data sources of the X sets of comparators are acquired from the packet according to the offset address.

In method 2, the comparison data sources of the X sets of comparators are acquired from meta-frame information according to the offset address.

The offset address refers to the offset relative to the first byte of the packet or the first byte of the meta-frame information. Exemplarily, assuming that the offset address of a certain comparator is A, the method for acquiring the comparison data source of the comparator is: offsetting by A bytes from the first byte of the packet or the first byte of the meta-frame information, and taking a certain amount of data starting from the (A+1)-th byte, as the comparison data source.

Corresponding to operation S240, if each set of comparators in the X sets of comparators supports 2 comparison logics, then the configuration information corresponding to the forwarding type includes a total of 2X comparators, and 2X comparison data sources are acquired according to the offset address of each comparator; assuming that each set of comparators in the X sets of comparators supports 3 comparison logics, then the configuration information corresponding to the forwarding type includes a total of 3X comparators, and 3X comparison data sources are acquired according to the offset address of each comparator.

In an optional implementation, the offset addresses of different comparators may be the same or different.

In an optional implementation, the lengths of the comparison data sources may be at least one of 8 bits, 16 bits, or 32 bits.

In operation S260, the comparison data source of an i-th set of comparators is input to the i-th set of comparators to obtain an i-th comparison result, where $1 \leq i \leq X$, X is the number of comparator sets included in the configuration information.

In an optional implementation, each set of comparators includes 2 or 3 comparison data sources, and the comparison data sources may be compared with the immediate data that is configurable based on labels, or they can be compared with each other.

In a possible implementation, when the i-th set of comparators includes two comparators; the method for inputting the comparison data source of the i-th set of comparators to the i-th set of comparators to obtain the i-th comparison result may include the following operation 1 to operation 4.

In operation 1, a first comparison data source of the i-th set of comparators is input to a first comparator in the i-th set of comparators to obtain a first sub-result, and a second comparison data source of the i-th set of comparators is input to a second comparator in the i-th set of comparators to obtain a second sub-result.

The first sub-result may be represented by 0 and 1, and denoted as flag1. When the first sub-result is 1, it means that the characteristic field satisfies the required judgment logic; when the first sub-result is 0, it means that the characteristic field does not satisfy the required judgment logic.

The second sub-result may be represented by 0 and 1, and denoted as flag2. When the second sub-result is 1, it means that the characteristic field satisfies the required judgment logic; when the second sub-result is 0, it means that the characteristic field does not satisfy the required judgment logic.

In operation 2, whether the label, the first sub-result and the second sub-result match a condition of the i-th set of comparators is judged.

The first sub-result and the second sub-result may be combined with the label to form a key value of condition matching, which is denoted as key value={flag1, flag2, label}.

Exemplarily, the conditions of the i-th set of comparators may include any one or any combination of the following four conditions: IF(label.A), IF(label.B), IF(label.A & label.B), and IF(label.A||label.B).

Since the dynamic selection sources of comparators under different labels are variable, it is necessary to take the label into account to determine whether the first sub-result and the second sub-result match the condition of the i-th set of comparators.

In operation 3, the i-th comparison result is output as true if the label, the first sub-result and the second sub-result match the condition of the i-th set of comparators.

If the key value={flag1, flag2, label} matches the condition of the i-th set of comparators, then the i-th comparison result is output as true.

In operation 4, the i-th comparison result is output as false if the label, the first sub-result and the second sub-result do not match the condition of the i-th set of comparators.

If the key value={flag1, flag2, label} does not match the condition of the i-th set of comparators, then the i-th comparison result is output as false.

In another possible implementation, when the i-th set of comparators includes three comparators; the method for inputting the comparison data source of the i-th set of comparators to the i-th set of comparators to obtain the i-th comparison result may include the following operation 1 to operation 4.

In operation 1, a first comparison data source of the i-th set of comparators is input to a first comparator in the i-th set of comparators to obtain a first sub-result, a second comparison data source of the i-th set of comparators is input to a second comparator in the i-th set of comparators to obtain a second sub-result, and a third comparison data source of the i-th set of comparators is input to a third comparator in the i-th set of comparators to obtain a third sub-result.

The first sub-result may be represented by 0 and 1, and denoted as flag1. When the first sub-result is 1, it means that the characteristic field satisfies the required judgment logic; when the first sub-result is 0, it means that the characteristic field does not satisfy the required judgment logic.

The second sub-result may be represented by 0 and 1, and denoted as flag2. When the second sub-result is 1, it means that the characteristic field satisfies the required judgment logic; when the second sub-result is 0, it means that the characteristic field does not satisfy the required judgment logic.

The third sub-result may be represented by 0 and 1, and denoted as flag3. When the third sub-result is 1, it means that the characteristic field satisfies the required judgment logic; when the third sub-result is 0, it means that the characteristic field does not satisfy the required judgment logic.

In operation 2, whether the label, the first sub-result, the second sub-result, and the third sub-result match a condition of the i-th set of comparators is judged.

The first sub-result, the second sub-result, and the third sub-result may be combined with the label to form a key value of condition matching, which is denoted as key value={flag1, flag2, flag3, label}.

Since the dynamic selection sources of comparators under different labels are variable, it is necessary to take the label into account to determine whether the first sub-result, the second sub-result, and the third sub-result match the condition of the i-th set of comparators.

In operation 3, the i-th comparison result is output as true if the label, the first sub-result, the second sub-result, and the third sub-result match the condition of the i-th set of comparators.

If the key value={flag1, flag2, flag3, label} matches the condition of the i-th set of comparators, then the i-th comparison result is output as true.

In operation 4, the i-th comparison result is output as false if the label, the first sub-result, the second sub-result, and the third sub-result do not match the condition of the i-th set of comparators.

If the key value={flag1, flag2, flag3, label} does not match the condition of the i-th set of comparators, then the i-th comparison result is output as false.

In operation S270, the forwarding rule of the packet is determined according to X comparison results, the label and a forwarding rule matching table.

In an optional implementation, the forwarding rule of the packet includes at least one of a packet search or an instruction execution set.

The X true/false comparison results and labels are matched with the forwarding rule matching table to determine the forwarding rules of the packet (including but not limited to different forwarding prefix searches or instruction requests).

In an optional implementation, if the X true/false comparison results and labels are not successfully matched in the forwarding rule matching table, no processing is performed on the packet or the packet is discarded.

A packet forwarding method provided by the embodiment of the present application includes: determining a forwarding type of a packet, and acquiring configuration information corresponding to the forwarding type, the configuration information including a comparison type and an offset address of at least one set of comparators; configuring the at least one set of comparators according to the comparison type; acquiring a comparison data source of the at least one set of comparators according to the offset address; and determining a forwarding rule of the packet according to the comparison type of the at least one set of comparators as configured and the comparison data source of the at least one set of comparators as configured. Thus, the comparators can be dynamically edited according to the forwarding types of different forwarding services, the traditional static conditional comparators can be converted into dynamic conditional comparators, and the reuse of the comparators under various service types can be realized, so that flexible handling of multiple types of forwarding services is realized without increasing the number of comparators, which ensures that the forwarding condition judgment of multiple service types by PPC of each stage is not only service-independent, but also applicable to multiple services and new service types.

FIG. 3 shows a schematic structural diagram of a packet forwarding device. As shown in FIG. 3, the packet forwarding device includes: a type determination module 10, a comparator configuration module 11, a data acquisition module 12 and a rule matching module 13.

The type determination module 10 is configured to determine a forwarding type of a packet.

The comparator configuration module 11 is configured to acquire configuration information corresponding to the forwarding type, the configuration information including a comparison type and an offset address of at least one set of comparators; and to configure the at least one set of comparators according to the comparison type.

The data acquisition module 12 is configured to acquire a comparison data source of the at least one set of comparators according to the offset address.

The rule configuration module 13 is configured to determine a forwarding rule of the packet according to the comparison type of the at least one set of comparators as configured and the comparison data source of the at least one set of comparators as configured.

The packet forwarding device provided by the embodiment of the present application is configured to implement the packet forwarding method provided by the embodiment of the present application. The implementation principle and technical effect of the packet forwarding device are similar to those of the above-mentioned packet forwarding method, which will not be repeated here.

In an optional implementation, the type determination module 10 may be configured to determine the forwarding type of the packet according to a characteristic field of the packet and a node access mode, and to allocate a label to the forwarding type.

In an optional implementation, one label corresponds to one type of configuration information; or, at least two labels correspond to one type of configuration information.

In an optional implementation, the data acquisition module 12 may be configured to acquire the comparison data source of the at least one set of comparators from the packet according to the offset address; or to acquire the comparison data source of the at least one set of comparators from meta-frame information according to the offset address.

In an optional implementation, the rule configuration module 13 may be configured to input the comparison data source of an i-th set of comparators to the i-th set of comparators to obtain an i-th comparison result, where $1 \leq i \leq X$, X is a number of comparator sets included in the configuration information; and to determine the forwarding rule of the packet according to X comparison results, the label and a forwarding rule matching table, the forwarding rule of the packet including at least one of a packet search or an instruction execution set.

In an optional implementation, when the i-th set of comparators includes two comparators, the rule configuration module 13 may be configured to input a first comparison data source of the i-th set of comparators to a first comparator in the i-th set of comparators to obtain a first sub-result, and to input a second comparison data source of the i-th set of comparators to a second comparator in the i-th set of comparators to obtain a second sub-result; to judge whether the label, the first sub-result and the second sub-result match a condition of the i-th set of comparators; to output the i-th comparison result as true if the label, the first sub-result and the second sub-result match the condition of the i-th set of comparators; and to output the i-th comparison result as false if the label, the first sub-result and the second sub-result do not match the condition of the i-th set of comparators.

In an optional implementation, when the i-th set of comparators includes three comparators, the rule configuration module 13 may be configured to input a first comparison data source of the i-th set of comparators to a first comparator in the i-th set of comparators to obtain a first sub-result, to input a second comparison data source of the i-th set of comparators to a second comparator in the i-th set of comparators to obtain a second sub-result, and to input a third comparison data source of the i-th set of comparators to a third comparator in the i-th set of comparators to obtain a third sub-result; to judge whether the label, the first sub-result, the second sub-result and the third sub-result match a condition of the i-th set of comparators; to output the i-th comparison result as true if the label, the first sub-result, the second sub-result and the third sub-result match the condition of the i-th set of comparators; and to output the i-th comparison result as false if the label, the first sub-result, the second sub-result and the third sub-result do not match the condition of the i-th set of comparators.

In an optional implementation, the comparison type includes at least one of greater than, less than, equal to, not equal to, greater than or equal to, or less than or equal to.

Figure 4:
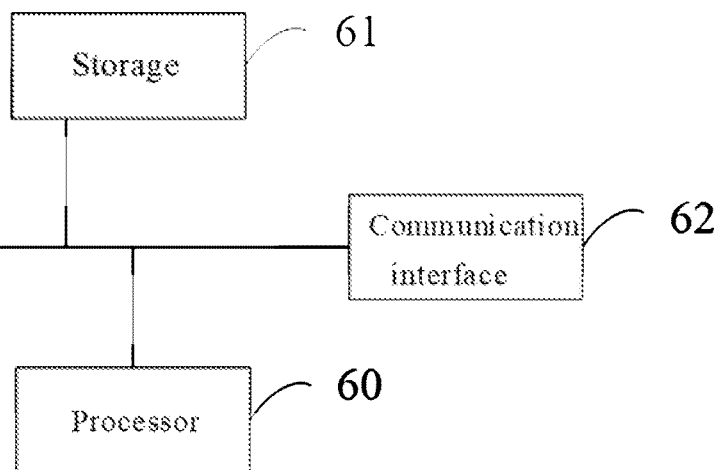
FIG. 4 is a schematic structural diagram of a programmable forwarding chip.

An embodiment of the present application further provides a packet forwarding device including a processor which is configured to, when executing a computer program, implements the packet forwarding method provided by the embodiments of the present application. Exemplarily, the packet forwarding device may be a programmable forwarding chip. FIG. 4 is a schematic structural diagram of a programmable forwarding chip. As shown in FIG. 4, the programmable forwarding chip may include a processor 60, a storage 61 and a communication interface 62; the number of processors 60 in the programmable forwarding chip may be one or more, and one processor 60 is taken as an example in FIG. 4. The processor 60, the storage 61, and the communication interface 62 in the programmable forwarding chip may be connected by a bus or in other ways, and the connection by a bus is taken as an example in FIG. 4. The bus represents one or more of several types of bus structures, including a memory bus or a memory controller, a peripheral bus, a graphics acceleration port, a processor, or a local bus using any of a variety of bus structures.

As a computer readable storage medium, the storage 61 may be configured to store software programs, computer executable programs, and modules, such as program instructions/modules corresponding to the packet forwarding method provided by the embodiments of the present application. The processor 60 executes at least one functional application and data processing of the programmable forwarding chip by running the software programs, instructions and modules stored in the storage 61, that is, implements the above-mentioned packet forwarding method.

The storage 61 may include a storage program area and a storage data area, wherein the storage program area may store an operating system, an application required for at least one function; the storage data area may store data created according to the use by the programmable forwarding chip, and the like. In addition, the storage 61 may include high-speed random-access memory, and may also include non-volatile memory, such as at least one magnetic disk storage device, flash memory device, or other non-volatile solid-state storage device. In some examples, the storage 61 may include a storage located remotely from the processor 60, which may be connected to the programmable forwarding chip via a network. Examples of the above network includes, but is not limited to, the Internet, an intranet, a local area network, a mobile communication network, and combinations thereof.

The communication interface 62 may be configured for the reception and transmission of data.

An embodiment of the present application further provides a computer readable storage medium storing thereon a computer program which, when executed by a processor, implements the packet forwarding method provided by the embodiments of the present application.

The computer storage medium provided by the embodiments of the present application may adopt any combination of one or more computer readable media. The computer readable medium may be a computer readable signal medium or a computer readable storage medium. The computer readable storage medium may be, for example, but not limited to, an electrical, magnetic, optical, electromagnetic, infrared, or semiconductor system, apparatus or device, or any combination thereof. The computer readable storage medium includes (non-exhaustive list): an electrical connection with one or more wires, a portable computer disk, a hard disk, a Random-Access Memory (RAM), a Read-Only Memory (ROM), an Electrically Erasable Programmable Read-Only Memory (EPROM), a flash memory, an optical fiber, a portable Compact Disc Read-Only Memory (CD-ROM), an optical memory device, a magnetic memory device, or any suitable combination thereof. In the present application, the computer readable storage medium may be any tangible medium that contains or stores a program that may be used by or used in combination with an instruction execution system, apparatus, or device.

The computer readable signal medium may include a data signal carrying computer readable program code propagated in baseband or as part of a carrier wave. Such propagated data signal may take a variety of forms, including but not limited to an electromagnetic signal, an optical signal, or any suitable combination thereof. A computer readable signal medium may also be any computer readable medium other than a computer readable storage medium, the computer readable medium can transmit, propagate, or transport the program for use by or in combination with an instruction execution system, apparatus, or device.

The program code contained on the computer readable medium may be transmitted using any suitable medium, including but not limited to wireless, wire, optical fiber cable, Radio Frequency (RF), etc., or any suitable combination thereof.

The computer program code for performing the operations of the present application may be written in one or more programming languages or a combination of multiple programming languages, the programming languages include object-oriented programming languages (such as Java, Smalltalk, C++, Ruby, Go), and also include conventional procedural programming languages (such as "C" or similar programming languages). The program code may be executed entirely on a user's computer, partly on a user's computer, as a stand-alone software package, partly on a user's computer and partly on a remote computer, or entirely on a remote computer or server. In the case of a remote computer, the remote computer may be connected to the user's computer via any kind of network, including a Local Area Network (LAN) or Wide Area Network (WAN), or it may be connected to an external computer (for example, connected via the internet using an internet service provider).

As will be understood by those skilled in the art, the term user terminal encompasses any suitable type of wireless user equipment such as a mobile telephone, portable data processing device, portable web browser or vehicle mounted mobile station.

In general, the various embodiments of the present application may be implemented in hardware or dedicated circuits, software, logic, or any combination thereof. For example, some aspects may be implemented in hardware, while other aspects may be implemented in firmware or software that may be executed by a controller, microprocessor or other computing device, although the application is not limited thereto.

The embodiments of the present application may be implemented by the execution of computer program instructions by a data processor of a mobile device, e.g., in a processor entity, or by hardware, or by a combination of software and hardware. The computer program instructions may be assembly instructions, Instruction Set Architecture (ISA) instructions, machine instructions, machine-dependent instructions, microcode, firmware instructions, state setting data, or source code or object code written in any combination of one or more programming languages.

The block diagrams of any logic flow in the drawing of the present application may represent program operations, or may represent interconnected logic circuits, modules and functions, or may represent a combination of program operations and logic circuits, modules and functions. The computer programs may be stored on a storage. The storage may be of any type suitable for the local technical environment and may be implemented using any suitable data storage technology, such as, but not limited to, a read only memory (ROM), a random-access memory (RAM), an optical memory device and system (Digital Versatile Disc (DVD) or CD), etc. The computer readable medium may include non-transitory storage media. The data processor may be of any type suitable for the local technical environment, such as, but not limited to, a general-purpose computer, a dedicated computer, a microprocessor, a Digital Signal Processor (DSP), an Application Specific Integrated Circuit (ASIC), a Programmable Logic Device (PLD), a Field-Programmable Gate Array (FGPA), and a processor based on multi-core processor architecture.

What is claimed is:

1. A packet forwarding method, implemented by a packet process cell comprised in a programmable forwarding chip, comprising:

determining a forwarding type of a packet, and acquiring configuration information corresponding to the forwarding type, the configuration information comprising a comparison type and an offset address corresponding to at least one set of comparators;

configuring the at least one set of comparators according to the comparison type;

acquiring a comparison data source of the at least one set of comparators according to the offset address; and determining a forwarding rule of the packet according to the comparison type of the at least one set of comparators as configured and the comparison data source of the at least one set of comparators as configured.

2. The packet forwarding method of claim 1, wherein the determining the forwarding type of the packet comprises:

determining the forwarding type of the packet according to a characteristic field of the packet and a node access mode, and allocating a label to the forwarding type, wherein the node access mode is a forwarding mode configured by a node in which the programmable forwarding chip is located, and comprises at least one of a Layer 2 Media Access Control (MAC) address forwarding mode, a Layer 3 Internet Protocol (IP) routing address forwarding mode, or a Multiple Protocol Label Switching (MPLS) label forwarding mode.

3. The packet forwarding method of claim 2, wherein, one label corresponds to one type of configuration information; or at least two labels correspond to one type of configuration information.

4. The packet forwarding method of claim 1, wherein the acquiring the comparison data source of the at least one set of comparators according to the offset address comprises:

acquiring the comparison data source of the at least one set of comparators from the packet according to the offset address; or acquiring the comparison data source of the at least one set of comparators from meta-frame information according to the offset address.

5. The packet forwarding method of claim 2, wherein the determining the forwarding rule of the packet according to the comparison type of the at least one set of comparators as configured and the comparison data source of the at least one set of comparators as configured comprises:

inputting the comparison data source of an i-th set of comparators to the i-th set of comparators to obtain an i-th comparison result, where $1 \le i \le X$, i denotes an integer index identifying one of the at least one set of comparators, and X is a number of comparator sets comprised in the configuration information; and determining the forwarding rule of the packet according to X comparison results, the label and a forwarding rule matching table, the forwarding rule of the packet comprising at least one of a packet search or an instruction execution set.

6. The packet forwarding method of claim 5, wherein, in a case where the i-th set of comparators comprises two comparators, the inputting the comparison data source of the i-th set of comparators to the i-th set of comparators to obtain the i-th comparison result comprises:

inputting a first comparison data source of the i-th set of comparators to a first comparator in the i-th set of comparators to obtain a first sub-result, and inputting a second comparison data source of the i-th set of comparators to a second comparator in the i-th set of comparators to obtain a second sub-result;

judging whether the label, the first sub-result and the second sub-result match a condition of the i-th set of comparators;

outputting the i-th comparison result as true in response to a fact that the label, the first sub-result and the second sub-result match the condition of the i-th set of comparators; and outputting the i-th comparison result as false in response to a fact that the label, the first sub-result and the second sub-result do not match the condition of the i-th set of comparators.

7. The packet forwarding method of claim 5, wherein, in a case where the i-th set of comparators comprises three comparators, the inputting the comparison data source of the i-th set of comparators to the i-th set of comparators to obtain the i-th comparison result comprises:

inputting a first comparison data source of the i-th set of comparators to a first comparator in the i-th set of comparators to obtain a first sub-result, inputting a second comparison data source of the i-th set of comparators to a second comparator in the i-th set of comparators to obtain a second sub-result, and inputting a third comparison data source of the i-th set of comparators to a third comparator in the i-th set of comparators to obtain a third sub-result;

judging whether the label, the first sub-result, the second sub-result and the third sub-result match a condition of the i-th set of comparators;

outputting the i-th comparison result as true in response to a fact that the label, the first sub-result, the second sub-result and the third sub-result match the condition of the i-th set of comparators; and outputting the i-th comparison result as false in response to a fact that the label, the first sub-result, the second sub-result and the third sub-result do not match the condition of the i-th set of comparators.

8. The packet forwarding method of claim 1, wherein the comparison type comprises at least one of greater than, less than, equal to, not equal to, not less than, or not greater than.

9. A programmable forwarding chip comprising a packet process cell configured to:

determine a forwarding type of a packet, and acquire configuration information corresponding to the forwarding type, the configuration information comprising a comparison type and an offset address corresponding to at least one set of comparators;

configure the at least one set of comparators according to the comparison type;

acquire a comparison data source of the at least one set of comparators according to the offset address; and determine a forwarding rule of the packet according to the comparison type of the at least one set of comparators as configured and the comparison data source of the at least one set of comparators as configured.

10. A non-transitory computer readable storage medium storing thereon a computer program which, when executed by a packet process cell of a programmable forwarding chip, implements the packet forwarding method of claim 1.

11. The programmable forwarding chip of claim 9, wherein the determining the forwarding type of the packet comprises:

determining the forwarding type of the packet according to a characteristic field of the packet and a node access mode, and allocating a label to the forwarding type, wherein the node access mode is a forwarding mode configured by a node in which the programmable forwarding chip is located, and comprises at least one of a Layer 2 MAC address forwarding mode, a Layer 3 IP routing address forwarding mode, or an MPLS label forwarding mode.

12. The programmable forwarding chip of claim 11, wherein, one label corresponds to one type of configuration information; or at least two labels correspond to one type of configuration information.

13. The programmable forwarding chip of claim 9, wherein the acquiring the comparison data source of the at least one set of comparators according to the offset address comprises:

acquiring the comparison data source of the at least one set of comparators from the packet according to the offset address; or acquiring the comparison data source of the at least one set of comparators from meta-frame information according to the offset address.

14. The programmable forwarding chip of claim 11, wherein the determining the forwarding rule of the packet according to the comparison type of the at least one set of comparators as configured and the comparison data source of the at least one set of comparators as configured comprises:

inputting the comparison data source of an i-th set of comparators to the i-th set of comparators to obtain an i-th comparison result, where $1 \leq i \leq X$, i denotes an integer index identifying one of the at least one set of comparators, and X is a number of comparator sets comprised in the configuration information; and determining the forwarding rule of the packet according to X comparison results, the label and a forwarding rule matching table, the forwarding rule of the packet comprising at least one of a packet search or an instruction execution set.

15. The programmable forwarding chip of claim 14, wherein, in a case where the i-th set of comparators comprises two comparators, the inputting the comparison data source of the i-th set of comparators to the i-th set of comparators to obtain the i-th comparison result comprises:

inputting a first comparison data source of the i-th set of comparators to a first comparator in the i-th set of comparators to obtain a first sub-result, and inputting a second comparison data source of the i-th set of comparators to a second comparator in the i-th set of comparators to obtain a second sub-result;

judging whether the label, the first sub-result and the second sub-result match a condition of the i-th set of comparators;

outputting the i-th comparison result as true in response to a fact that the label, the first sub-result and the second sub-result match the condition of the i-th set of comparators; and outputting the i-th comparison result as false in response to a fact that the label, the first sub-result and the second sub-result do not match the condition of the i-th set of comparators.

16. The programmable forwarding chip of claim 14, wherein, in a case where the i-th set of comparators comprises three comparators, the inputting the comparison data source of the i-th set of comparators to the i-th set of comparators to obtain the i-th comparison result comprises:

inputting a first comparison data source of the i-th set of comparators to a first comparator in the i-th set of comparators to obtain a first sub-result, inputting a second comparison data source of the i-th set of comparators to a second comparator in the i-th set of comparators to obtain a second sub-result, and inputting a third comparison data source of the i-th set of comparators to a third comparator in the i-th set of comparators to obtain a third sub-result;

judging whether the label, the first sub-result, the second sub-result and the third sub-result match a condition of the i-th set of comparators;

outputting the i-th comparison result as true in response to a fact that the label, the first sub-result, the second sub-result and the third sub-result match the condition of the i-th set of comparators; and outputting the i-th comparison result as false in response to a fact that the label, the first sub-result, the second sub-result and the third sub-result do not match the condition of the i-th set of comparators.

17. The programmable forwarding chip of claim 9, wherein the comparison type comprises at least one of greater than, less than, equal to, not equal to, not less than, or not greater than.

* * * * *